E. W. WINSLOW.
MOTOR FRICTION PHONOGRAPH MECHANISM.
APPLICATION FILED APR. 6, 1921.
1,425,353.
Patented Aug. 8, 1922.
2 SHEETS—SHEET 2.
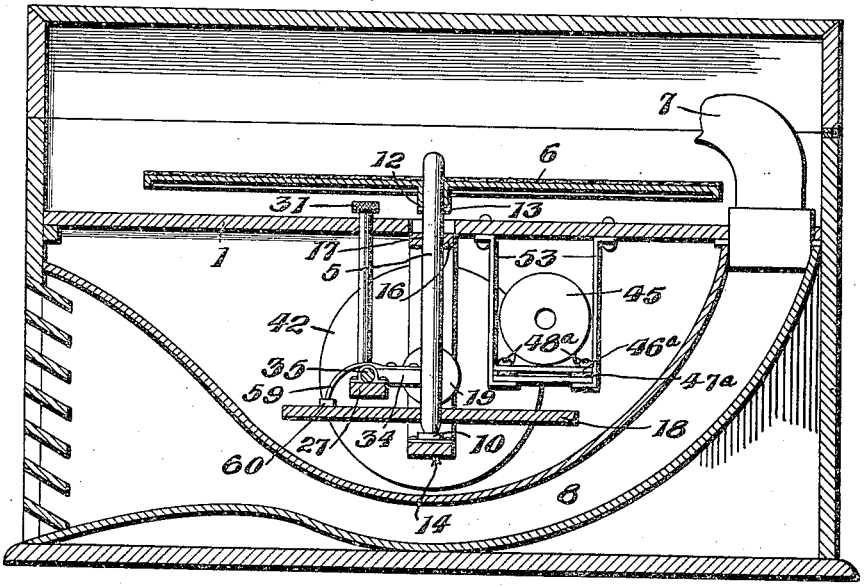
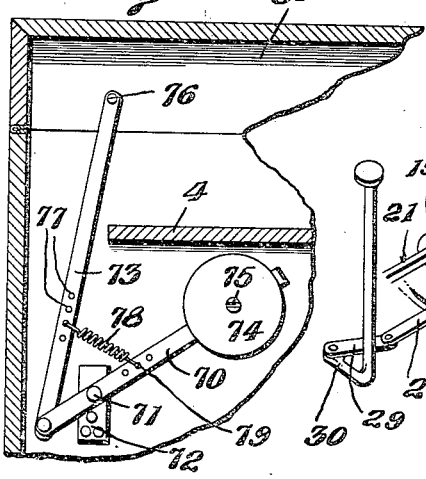
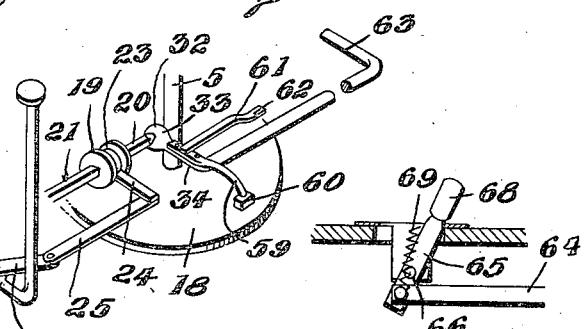
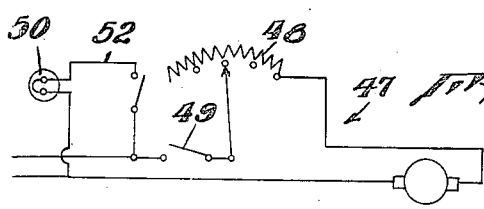
Inventor
Edward W. Winslow
By
Attorney

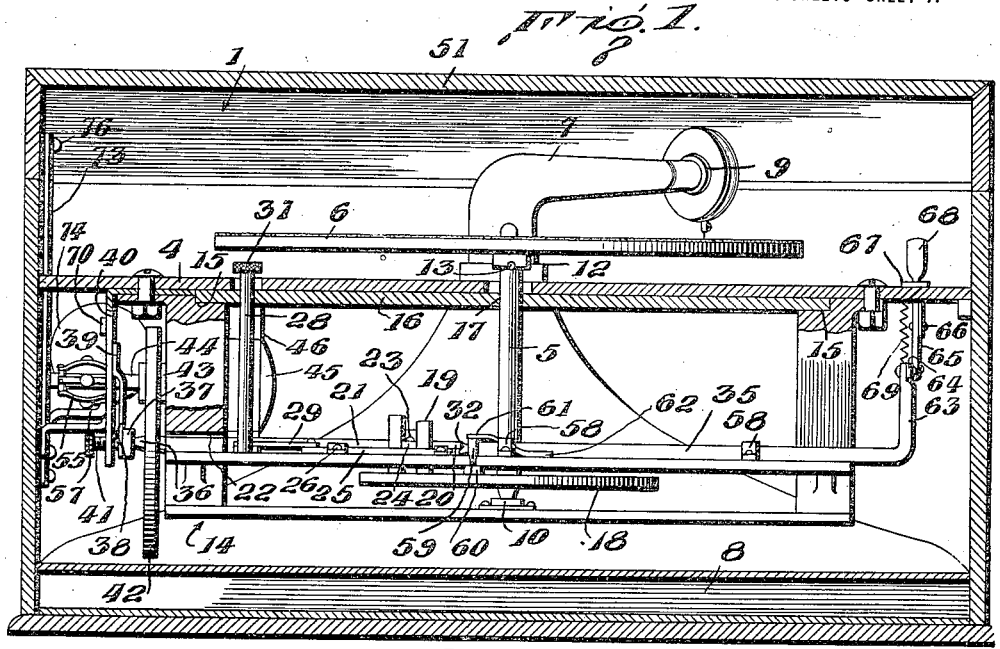

UNITED STATES PATENT OFFICE.

EDWARD W. WINSLOW, OF BELLE PLAINE, IOWA.

MOTOR-FRICTION PHONOGRAPH MECHANISM.

1,425,353.   Specification of Letters Patent.   Patented Aug. 8, 1922.

Application filed April 6, 1921. Serial No. 459,076.

*To all whom it may concern:*

Be it known that I, EDWARD W. WINSLOW, a citizen of the United States, residing at Belle Plaine, in the county of Benton and State of Iowa, have invented new and useful Improvements in Motor-Friction Phonograph Mechanism, of which the following is a specification.

The invention relates to a motor friction phonograph mechanism.

The object of the present invention is to improve the construction of mechanism for operating and controlling the rotary record disk carrying turn table of a phonograph or talking machine and to provide a simple, practical and efficient motor friction phonograph mechanism of comparatively inexpensive construction equipped with an electric motor and with friction driving means connecting the electric motor with the spindle of the rotary turn table and having adjustable elements or members for enabling the speed of rotation of the turn table to be readily controlled.

Another object of the invention is to provide for the said friction driving mechanism means for simultaneously disconnecting the driving means from the spindle and for braking one element of the disconnected means and for also engaging the disconnected elements and simultaneously releasing the brake mechanism, whereby the rotary turn table may be easily and quickly started and stopped.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of references designate corresponding parts in the several figures:—

Figure 1 is a vertical sectional view of a phonograph, provided with motor driven mechanism constructed in accordance with this invention.

Figure 2 is a horizontal sectional view of the same.

Figure 3 is a vertical sectional view taken at right angles to Figure 1.

Figure 4 is a detail sectional view illustrating the manner of counterbalancing the lid of the phonograph.

Figure 5 is a detail perspective view illustrating the manner of mounting and adjusting the slidable friction pinion and the brake arm.

Figure 6 is a detail sectional view illustrating the manner of mounting the operating lever.

Figure 7 is a diagrammatic view showing the electric circuit.

In the accompanying drawings, in which is illustrated the preferred embodiment of the invention, 1 designates a phonograph body or casing composed of a central compartment 2 and side record receiving compartments 3 but the motor driven friction mechanism of the present invention may of course be applied to any style of cabinet or casing as will be readily understood. The central compartment of the body 1 is provided with a top wall or table 4 through which extends a vertical spindle 5 carrying a removable rotary turn table 6 located above the top wall of the body and adapted to receive phonograph records in the usual manner. A tone arm 7 of any construction may be employed and may be connected with a horn or sound box 8 and be equipped with a reproducer 9 of any preferred construction and as these elements of the phonograph do not constitute a part of the present invention and as various constructions of the same may be employed, detail description and illustration of such features are deemed unnecessary. The vertical spindle 5 is stepped at its lower end in a suitable bearing 10 and the rotary turn table, which may be constructed in any suitable manner, is provided at the lower side with a sleeve having opposite notches 12 for engaging with a laterally projecting pin 13 whereby the rotary turn table is interlocked with the vertical spindle 5 and is adapted to be positively rotated by the same. Also the construction permits the turn table to be readily removed from the vertical spindle and replaced thereon in proper engagement with the same. The bearing 10 is carried by a hanger 14 composed of spaced substantially vertical sides and a connecting bottom portion, the bearing 10 being arranged centrally of the said bottom portion as clearly illustrated in Figure 1 of the drawings. The sides of the hanger 14 are provided at their upper ends with inner aligned recesses 15 in which are secured the terminals of a detachable top bar or member 16 which is provided with a central bearing 17 for the upper portion of the vertical spindle.

Mounted upon the lower portion of the vertical spindle is a combined friction and brake wheel 18 arranged horizontally and located adjacent the bottom connecting portion of the hanger 14 and adapted to be frictionally engaged at its upper face by a friction pinion 19 slidably mounted on a squared portion 20 of a horizontal driving shaft 21 journaled intermediate of its ends in a bearing opening 22 in one side of the hanger 14 and extending inwardly and outwardly with respect to the said side of the hanger. The inner portion 20 which extends inwardly from the said side of the hanger is square and the portion of the shaft within the bearing, as well as the outer portion of the said shaft 21, is round. The friction pinion is provided with an extending grooved hub 23 which is engaged by a lug or projection 24 of a slide 25 mounted in suitable guides 26 and arranged upon a supporting member or shelf 27 projecting from the lower portions of the sides of the hanger 14. The shelf 27 extends from one side of the hanger and the slide which is actuated by a vertical operating shaft 28 is adapted to be moved inwardly and outwardly to carry the friction pinion 19 toward and from the center of the combined friction and brake wheel 18 to vary the speed of the same. The slide is connected by a link 29 with an arm 30 which extends from the lower end of the vertical operating shaft 28 and the latter is mounted in suitable bearings and is extended through the top wall or table of the body. The upper end of the operating shaft 28 is provided with a knob or head 31 adapted to be readily grasped by the operator to shift the slide 25. Any other suitable operating means may of course be employed and in practice any means may be provided for indicating the speed of the disk 18 and the rotary turn table 6 at the various adjustments of the operating device. The speed of the rotary table increases with the adjustment of the friction pinion toward the center of the combined friction and brake wheel 18 and the movement of the friction pinion toward the periphery of the said wheel 18 reduces the speed as will be readily understood.

The inner end 32 of the drive shaft 21 is tapered to form a cone journal and is journaled in a bearing recess 33 of an arm 34 of a rock shaft 35 and the outer end 36 of the horizontal drive shaft 21 is journaled in a bearing 37 mounted on the lower free portion of a spring 38 which is secured at its upper end 39 to a supporting bracket 40. The supporting bracket 40 which is preferably L-shaped as shown, consists of an upper horizontal portion and a pendent vertical portion, the horizontal portion being secured by screws or other suitable fastening devices to the lower face or top wall of the table of the cabinet or casing. The spring is provided adjacent its attached end 39 with an offset bend and its lower portion is adjustably positioned by a screw 41 mounted in a threaded opening of the vertical portion of the bracket 40 and adapted to adjust the bearing 37 inwardly and permit an adjustment of the bearing outwardly through the yielding action of the spring 38. The adjustable mounting of the horizontal drive shaft provides for the up and down movement of the inner portion of the drive shaft through the portion of the drive shaft as hereinafter fully explained. The horizontal drive shaft 21 has fixed to it a vertical friction wheel 42 located adjacent the outer end 36 of the shaft 21 and frictionally engaged by a motor friction pinion 43 mounted and suitably fixed to the shaft 44 of an electric motor 45. The electric motor 45 which is mounted in a hanger or bracket 46 has its shaft arranged horizontally and it is arranged in an electric circuit 47 including a rheostat 48 and a suitable switch 49. The electric circuit receives its current from any suitable source such as the electric light system and an electric light 50, which is mounted within the hinged lid 51 of the cabinet or casing is connected by suitable wires 52 with the circuit 47. In practice the electric light will be provided with a suitable switch for enabling it to be cut out in the daytime or when otherwise not required. The hanger or supporting bracket 46 which may be of any desired construction, consists of a shelf and attaching arms 53 and 54 having upper attaching portions adapted to be secured by screws or other suitable fastening devices at the lower face of the top wall or table of the cabinet or casing.

The motor shaft is equipped with a centrifugal governor 55 adapted as the speed of the motor shaft increases to move a friction disk 56 into engagement with a brake shoe 57 for maintaining the motor shaft at a uniform speed. Any suitable governor may of course be employed and the speed of the spindle 5 may be varied by the shiftable friction pinion 19 while the motor shaft rotates at a uniform speed.

The rock shaft 35 is journaled in suitable bearings 58 which are suitably secured upon the upper face of the projecting shelf or support 27. The shaft 35 extends longitudinally of the shelf or support 27 and the arm 34 which is arranged at the inner end of the rock shaft extends inwardly with respect thereto and carries a brake arm 59 which extends outwardly with respect to the rock shaft 35. The brake arm which is curved as shown to clear the shelf or support 27 is equipped at its outer end with a brake shoe 60 and when the shaft 35 is rocked to raise the arm 34 and lift the adjustable friction pinion out of contact with the combined friction wheel and brake disk 18, the brake shoe will be carried into engagement with the upper face of the combined friction wheel and brake disk and will stop the rotation of the same and the turn table carried by the vertical spindle 5. When the rock shaft is rotated in the reverse direction the brake shoe will be lifted from the wheel 18 and the adjustable friction pinion will be carried into contact with the said wheel 18. A plate spring 61 which is secured at its outer end 62 to the shelf or support 27 extends upwardly therefrom and longitudinally of the shelf or support, its inner free end bearing against the arm 34 at the upper face thereof for urging the said arm 34 downwardly to maintain the adjustable friction pinion 23 in tight frictional engagement with the combined friction wheel and brake disk 18.

The rock shaft 35 is provided at its outer end with an upwardly extending arm 63 which is connected by a link 64 with the lower end of an operating lever 65 pivoted intermediate of its ends at 66 adjacent the lower face of the top board or table of the casing or cabinet and extending upwardly through a slotted plate 67 which is secured to the said top board or table at the upper face thereof. The operating lever 66 is provided at its upper end with a handle or grip portion 68 and a coiled spring 69 is connected with the lower end of the operating lever and is adapted to be carried by the pivotal movement thereof from one side of the vertical plane of the pivot 66 to the opposite side thereof whereby the spring will operate to maintain the lever in either position. The upper end of the spring is connected to the underside of the top board centrally of the movement or throw of the lever and this arrangement permits the spring to be carried to opposite sides of the pivot of the lever by the swing of the latter. The supporting bracket 46 is preferably equipped with a bed plate 46ᵃ supported upon the shelf by cushions 47ᵃ and secured to the latter by screws 48ᵃ which pierce the cushions and secure the latter in position. The cushions may consist of blocks of rubber or other suitable cushioning means.

The lid 51 is counter-balanced by a weighted lever 70 pivoted intermediate of its ends at 71 to a suitable supporting plate 72 and connected at one end by a link 73 with the lid or hinged top 51. The pivot 71 is arranged to form a short rear arm and a relatively long arm upon which is mounted an adjustable weight 74 movable along the lever 70 and secured in its adjustment by a set screw 75. The link 73 which extends upwardly from the short arm of the weighted lever is pivoted at its upper end to the lid or hinged top at 76 adjacent to the hinged rear edge thereof and it is provided at intervals at its central portion with perforations 77 into which is hooked one end of a coiled spring 78 which has its other end attached at 79 to the long arm of the weighted lever 70. The coiled spring 78 is adjustably connected by means of the perforations 77 to the link 73 and it is adapted to limit the relative movements of the weighted lever and the link to vary the rise and fall of the weight. It is adapted to enable the lid to be easily lifted and to be maintained by the counter-balancing mechanism in any desired position from a closed position to a full open position. The weight which is preferably of circular form is slotted to receive the arm of the lever.

What is claimed is:—

1. Phonograph mechanism including a vertical spindle arranged to support a turn table, a combined friction and brake wheel connected with the spindle for rotating the same, driving mechanism having an adjustable friction pinion engaging the said wheel, a brake element arranged to engage the combined friction and brake wheel, and means for moving the brake element and the friction pinion simultaneously to engage one with the friction and brake wheel and move the other out of engagement therewith to start or stop the spindle.

2. Phonograph mechanism including a vertical spindle arranged to support a turn table, a combined friction and brake wheel connected with the spindle for rotating the same, driving mechanism having an adjustable friction pinion engaging the said wheel, a brake element arranged to engage the combined friction and brake wheel, and means for operating the friction pinion and the brake element for moving the same into and out of frictional engagement with the said wheel.

3. Phonograph mechanism including a vertical spindle provided with means for supporting a rotary turn table, a horizontally disposed combined friction and brake wheel mounted on the spindle, a horizontal drive shaft, a friction pinion slidably interlocked with the drive shaft and arranged to frictionally engage the said wheel, a motor, friction gearing connecting the motor with the drive shaft, means for adjusting the friction pinion to move the same toward and from the center of the combined friction and brake wheel, and means for moving the friction pinion into and out of engagement with the combined friction and brake wheel.

4. Phonograph mechanism including a vertical spindle adapted to support a rotary turn table, a combined friction and brake wheel mounted on the spindle, a drive shaft, an adjustable friction pinion slidably interlocked with the drive shaft and movable toward and from the center of the said wheel, a slide provided with an arm or portion arranged to move the friction pinion along the drive shaft, and an operating shaft provided with an arm connected with the slide.

5. Phonograph mechanism including a cabinet or casing having a top board or table, a spindle extending through the top board or table and adapted to support a rotary turn table, a combined friction and brake wheel connected with the spindle, a drive shaft having a friction pinion engaging the said wheel, a slide having means for moving the pinion along the drive shaft, and an operating shaft extending through the top board or casing and provided at the upper end with operating means and having an arm connected with the slide and adapted to actuate the same.

6. Phonograph mechanism including a cabinet or casing having a top board or table, a spindle extending through the top board or table and adapted to support a rotary turn table, a hanger secured to the top board or table and depending therefrom and having the said spindle mounted within it, a combined friction and brake wheel mounted on the spindle, a driving shaft journaled in the hanger, a friction pinion slidably interlocked with the drive shaft and adjustable with respect to the said wheel for varying the speed of the spindle, guiding means carried by the hanger, a slide arranged in parallelism with the drive shaft and having an arm connected with and adapted to slide the pinion along the said shaft, a vertical operating shaft extending through the top board or table of the casing or cabinet and provided at its upper end with operating means and having an arm at its lower end, and means for connecting the arm with the slide.

7. Phonograph mechanism including a hanger composed of spaced sides and a connecting bottom portion and provided at the sides with upper recesses, a top bar or member secured in the recesses, a vertical spindle mounted upon the hanger at the bottom thereof and extending through the top bar or member and adapted to support a rotary turn table, a horizontally disposed combined friction and break wheel mounted on the spindle, a horizontal drive shaft journaled in the hanger, a friction pinion slidably interlocked with the drive shaft and adjustable from and toward the center of the said wheel, and a supporting shelf extending from one side face of the hanger, a motor mounted at the opposite side face of the hanger, a friction wheel mounted on the drive shaft, a pinion mounted on the motor shaft and frictionally engaging the friction wheel of the drive shaft, and means mounted on the said shelf and connected with the adjustable friction pinion for moving the same along the drive shaft.

8. Phonograph mechanism including a vertical spindle adapted to support a rotary turn table, a combined friction and brake wheel connected with the spindle, a drive shaft located at one side of the spindle and having an adjustable friction pinion arranged to engage the said wheel, a movable member supporting one end of the drive shaft and having a brake element arranged to be moved into engagement with the said wheel when the pinion is moved out of engagement with the same and to be moved out of engagement with the said wheel when the pinion is moved into engagement therewith, and means for operating the said member.

9. Phonograph mechanism including a vertical spindle provided with a horizontal combined friction and brake wheel, a shaft having an angularly related arm, a drive shaft supported at one end by the said arm, a brake element extending from the shaft in the opposite direction to the arm, a friction pinion mounted on the drive shaft and movable along the same for engaging the said wheel at different points to vary the speed of the spindle, and means for operating the shaft to carry the friction pinion out of engagement with the friction wheel and move the brake element into engagement with the same and to move the friction pinion into engagement with the said wheel and carry the brake element out of engagement therewith.

10. Phonograph mechanism including a vertical spindle provided with a horizontal combined friction and brake wheel, a horizontal drive shaft, a friction pinion movable along the drive shaft for engaging the said wheel from different points from the center thereof to vary the speed of the spindle, a rock shaft having an inwardly extending arm provided with a bearing receiving and supporting the inner end of the drive shaft, said rock shaft being also provided with a brake arm extending in the opposite direction to the said arm and arranged to engage the said wheel, yieldable means for maintaining the friction pinion in engagement with the friction wheel, and operating mechanism connected with the rock shaft for partially rotating the same to carry the friction pinion and the brake arm into and out of engagement with the said wheel.

11. Phonograph mechanism including a vertical spindle provided with a horizontal combined friction and brake wheel, a horizontal drive shaft, a friction pinion movable along the drive shaft for engaging the said wheel from different points from the center thereof to vary the speed of the spindle, a rock shaft having an inwardly extending arm provided with a bearing receiving and supporting the inner end of the drive shaft, said rock shaft being also provided with a brake arm extending in the opposite direction to the said arm and arranged to engage the said wheel, a spring extending along the rock shaft and engaging the arm thereof for urging the pinion toward the said wheel, and operating means connected with the rock shaft for partially rotating the same.

12. Phonograph mechanism including a vertical spindle provided with a horizontal combined friction and brake wheel, a drive shaft, a pinion slidably mounted on the drive shaft and movable along the same to engage the said wheel at different points to vary the speed of the spindle, a movable support for the inner end of the drive shaft, a spring having a bearing receiving the outer end of the driving shaft and means for adjusting the spring.

13. Phonograph mechanism including a vertical spindle provided with a horizontal combined friction and brake wheel, a drive shaft, a pinion slidably mounted on the drive shaft and movable along the same to engage the said wheel at different points to vary the speed of the spindle, a movable support for the inner end of the drive shaft, a bracket, a pendent spring attached to its upper end to the bracket and provided intermediate of its ends with a bend offsetting the lower portion of the spring from the upper end, said spring being provided at its lower portion with a bearing supporting the outer end of the drive shaft, and a screw mounted in the bracket and arranged to adjust the said spring.

14. Phonograph mechanism including a hanger provided at one of its side faces with a projecting support or shelf, a vertical spindle mounted in the hanger and provided with a horizontal combined friction and brake wheel, a drive shaft, an adjustable pinion slidable along the drive shaft to engage the said wheel at different points, a slide mounted on the shelf or support and having an arm or portion connected with the said pinion, a rock shaft also mounted on the shelf or support and having an inwardly extending arm provided with a bearing receiving the inner end of the drive shaft, an outwardly extending brake arm connected with the rock shaft and arranged to engage the combined friction and brake wheel, a spring also mounted on the shelf or support and bearing against the said arm for holding the pinion in engagement with the said wheel means for operating the slide, and operating means for partially rotating the rock shaft.

15. Phonograph mechanism including a vertical spindle having a combined friction and brake wheel, a drive shaft, a pinion slidable on the drive shaft for engaging the said wheel at different points, a rock shaft provided with a brake arm and having a bearing arm supporting the inner end of the drive shaft, said rock shaft being also provided with an operating arm, an operating lever connected with the operating arm, and a spring connected with the operating lever and arranged to hold the same at either side of a central position.

16. Phonograph mechanism including a vertical spindle having a horizontal combined friction and brake wheel, a drive shaft having a friction pinion adjustable to engage the said wheel at different points, a rock shaft having a brake arm provided with a shoe and arranged to engage the said wheel, said rock shaft being also provided with an operating arm, a lever connected with the operating arm and arranged to partially rotate the rock shaft.

17. Phonograph mechanism including a vertical spindle having a horizontal combined friction and brake wheel, a drive shaft having a friction pinion adjustable to engage the said wheel at different points, a rock shaft having a brake arm provided with a shoe and arranged to engage the said wheel, said rock shaft being also provided with an operating arm, a lever connected with the operating arm and arranged to partially rotate the rock shaft, and a spring connected with the operating lever and arranged to hold the same at either side of a central position.

18. Phonograph mechanism including a cabinet or casing having a top board or table, a vertical spindle extending through the top board or table and adapted to carry a turn table and provided beneath the top board or table with a horizontal combined friction and brake wheel, a rock shaft having a brake arm arranged to engage the said wheel said rock shaft being also provided with an operating arm, an operating lever extending through the top board or table and connected with the operating arm of the rock shaft, and driving means having a pinion engaging the said wheel for rotating the spindle.

19. Phonograph mechanism including a cabinet or casing having a top board or table, a vertical spindle extending through the top board or table and adapted to carry a turn table and provided beneath the top board or table with a horizontal combined friction and brake wheel, a rock shaft having a brake arm arranged to engage the said wheel, said rock shaft being also provided with an operating arm, an operating lever extending through the top board or table and connected with the operating arm of the rock shaft, a drive shaft, a friction pinion slidable on the drive shaft and engaging the said wheel, and means for moving the pinion along the drive shaft having an operating shaft extending through the top board or table and provided with exteriorly arranged operating means.

In testimony whereof I have hereunto affixed my signature.

EDWARD W. WINSLOW.